United States Patent [19]

Stoll et al.

[11] 4,434,137

[45] Feb. 28, 1984

[54] METHOD FOR DISSOLVING HARD-TO DISSOLVE NUCLEAR FUELS

[75] Inventors: Wolfgang Stoll, Hanau; Wilhelm Ledebrink, Maintal, both of Fed. Rep. of Germany

[73] Assignee: Alkem GmbH, Hanau, Fed. Rep. of Germany

[21] Appl. No.: 212,453

[22] Filed: Dec. 3, 1980

[30] Foreign Application Priority Data

Dec. 20, 1979 [DE] Fed. Rep. of Germany ....... 2951510

[51] Int. Cl.$^3$ .................... C01G 56/00; C01F 15/00
[52] U.S. Cl. ........................................... 423/6; 423/20; 423/251; 423/252; 252/627
[58] Field of Search ................... 423/6, 8, 10, 3, 4, 423/18, 20, 251, 252; 252/627

[56] References Cited

U.S. PATENT DOCUMENTS

| | | | |
|---|---|---|---|
| 3,259,473 | 7/1966 | Hopkins, Jr. et al. | 423/251 |
| 3,359,078 | 12/1967 | Alter et al. | 423/251 X |
| 3,374,068 | 3/1968 | Erlandson et al. | 423/251 X |
| 3,394,996 | 7/1968 | Kispert et al. | 423/6 |
| 4,069,293 | 1/1978 | Tallent | 423/3 |
| 4,333,912 | 6/1982 | Mills et al. | 423/20 |

OTHER PUBLICATIONS

Stoller, S. M. and R. B. Richards, Eds. "Reactor Handbook, vol. II, Fuel Reprocessing", 2nd Ed. 1961, pp. 68–72, 107–108.
Katz, J. J. and G. T. Seaborg, "The Chemistry of the Actinide Elements", 1957, pp. 279, 284, 291–292, 312.
Long, Justine T. "Engineering for Nuclear Fuel Reprocessing", Gordon and Breach Science Publrs. Inc. 1968, pps. 288–290, 294–296.

*Primary Examiner*—Deborah L. Kyle
*Assistant Examiner*—Matthew A. Thexton
*Attorney, Agent, or Firm*—Herbert L. Lerner; Laurence A. Greenberg

[57] ABSTRACT

Dissolving hard-to-dissolve nuclear fuels such as $ThO_2$ and $PuO_2$ in a nitric acid fission material solution which contains nitric acid and a Pu-fluoride complex to provide free fluorine ions in a small catalytically active amount due to small dissociation of fluoride ions from the Pu-fluoride complex. This permits dissolving hard-to-dissolve nuclear fuels in normal metallic dissolving vessels and also eliminates need for using polytetrafluoroethylene.

5 Claims, No Drawings

METHOD FOR DISSOLVING HARD-TO DISSOLVE NUCLEAR FUELS

BACKGROUND OF THE INVENTION

1. Field of the Invention

The present invention relates to a method for dissolving hard-to-dissolve nuclear fuels such as thorium dioxide and plutonium dioxide, in a nitric-acid, fluoride ion-containing solution.

2. Background of the Invention

If plutonium-containing fuel assemblies are employed, Pu is used as sintered oxide $PuO_2$. In this form, it is particularly well suited as fuel because of its high melting point and the high sintering density. However, these advantages turn into disadvantages if the spent nuclear fuel is to be removed periodically from the reactor for the purpose of separating the fissionable material and is to be reprocessed. Due to the thermal history of the plutonium, it has extremely little solubility in the solvent, nitric acid, which is perferred for fuel processing. This applies especially to U/Pu-fuels which are mechanically mixed in their manufacture. These contain separate $UO_2$- and $PuO_2$-phases, of which only the $UO_2$-phases are soluble in nitric acid, and thus mainly $PuO_2$ remains as an insoluble residue in the solution.

The problem of dissolved $PuO_2$ is dealt with in German Published Non-Prosecuted Application No. 26 19 089. As solvent, a mixture of nitric acid and hydrofluoric acid is described. However, it is an obstacle to the practical employment of this method that this mixture has an extremely corrosive effect on metallic dissolving vessels. Even if special steels and rare metals are used (except platinum), the corrosion rates are so high that an extended use of metal vessels is not possible, especially since as undesirable fringe phenomena, contamination of the nuclear fuel solution by dissolved metal would occur. When dissolving small amounts of $PuO_2$ on a laboratory scale, this problem can be circumvented through the use of fluorine-containing, corrosion-resistant plastics, for instance, polytetrafluoroethylene. To apply this vessel technique to the dimensions of a dissolution vessel in a reprocessing plant is extremely difficult.

SUMMARY OF THE INVENTION

An object of the present invention is to provide a method for dissolving hard-to-dissolve nuclear fuels in which one can operate with normal metallic dissolving vessels and also without using polytetrafluoroethylene.

With the foregoing and other objects in view, there is provided in accordance with the invention a method for dissolving hard-to-dissolve nuclear fuels such as $ThO_2$ and $PuO_2$ in a nitric acid fission material solution containing fluoride ions, which comprises adding hard-to-dissolve nuclear fuel to a nitric acid fission material solution to dissolve the nuclear fuel in which said solution contains nitric acid and a Pu-fluoride complex to provide free fluoride ions in a small catalytically active amount due to small dissociation of fluoride ions from the Pu-fluoride complex.

Other features which are considered as characteristic for the invention are set forth in the appended claims.

Although the invention is illustrated and described herein as embodied in a method for dissolving hard-to-dissolve nuclear fuels, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

In accordance with the invention, the solution for dissolving the nuclear fuel contains nitric acid, Pu in solution and free fluorine ions ($F^-$) in a small, catalytically active amount due to the low dissociation of an $F^-$-binding Pu-fluoride complex. The nuclear fuels in powder form are added to the solution; and are dissolved at an elevated temperature to facilitate dissolution, preferably at the boiling temperature of the solution for several hours.

The fluoride ions complex-bound at the fission material may be relocated into a more stable complex through the addition of zirconium salts or other more stable sequestering agents while at the same time liberating the fission materials, which are converted into a practically fluoride-free nuclear fuel solution in a manner known per se by separating the fluoride complexes in ion exchangers.

After the hard-to-dissolve oxide is dissolved, and after selective precipitation and separation of the dissolved substances by methods known per se, the remaining solution, which still contains small dissolved amounts of fission material with complex-bound fluoride ions, may be used again as solvent for dissolving further amounts of oxide.

Contrary to the mentioned state of the art, the solution used here contains fluoride ions only in catalytically active amounts. These are present due to the dissociation equilibrium of the plutonium fluoride complex formed from Pu(IV) and $F^-$ and can be calculated via the stability constant K of the complex:

$$K = \frac{[PuF^{3+}]}{[Pu^{4+}][F^-]}$$

= concentration ratio of the Pu-complex to the dissociated component thereof.

It has been found that the low concentration of free fluoride ions are sufficient for dissolving, and this solution did not have a more agressive effect, i.e. corrosive effect, than the nitric acid itself. It is, therefore, possible to employ metallic dissolving vessels on a technical scale.

Instead of a $PuF^{3+}$ starting solution, other $F^-$-binding substances can be used, the presence of which does not interfere in the fission material solution and in addition, simplifies the balancing the plutonium as fission material; for instance, $UF_4$ is added to the initially present nitric acid/$PuO_2$ suspension.

To avoid excessively high $F^-$-concentrations which cause a corrosive attack on the dissolving vessel, another procedure may be employed. First, $PuO_2$ is dissolved in pure concentrated nitric acid. As is well known, the dissolving rates are very low, but a small dissolved Pu-content is sufficient to now be able to add hydrofluoric acid or another fluorine carrier in very small amounts and to increase the dissolving rate drastically, forming the $PuF^{3+}$ complex by means of the free fluoride ions, adding fluorides from time to time.

To explain this invention in further detail, reference is made to the following embodiment examples, in which it is also shown how the fluoride ions are separated from the fission material solution and can optionally be recycled.

EXAMPLE 1

1 kg aged, hard-to-dissolve $PuO_2$ is to be dissolved for separating americium. The powdered fission material is mixed in a 5-1 alloy steel vessel with 3.5 l of a solution of 14.5 molar $HNO_3$, 0.05 molar HF and 0.05 molar Pu(IV) nitrate solution (=12 g Pu/l) and is brought to dissolution at the boiling temperature. The $F^-$-ions are, to a very large extent, bound from the start in the complex to the Pu(IV). The stability constant K of the $PuF^{3+}$ complex in this solution is $8.7 \times 10^7$.

The measurement of the free $F^-$-concentration in this solution is not possible directly. If in a sample of this solution, the $H^+$-concentration is set to pH=5, then a free $F^-$-concentration of less than 10 mg/l can be determined by measurement. Although, due to the dissociation equilibrium of the complex, as is found from the stability constant, the $F^-$-concentration decreases with increasing $Pu^{4+}$-concentration, this catalytically small amount is sufficient to bring about 95% dissolution of the $PuO_2$ in about eight hours.

After this dissolution, the liquid is filtered off and 5% of the $PuO_2$ remain undissolved in the filter. In the filtered fission material solution with a concentration of 240 g Pu/l, the separation of americium can then be brought about by precipitation of the Pu as Pu-oxalate, for instance, according to the proposal in German Published Non-Prosecuted Application No. 26 24 990, after dilution to a 2.6-molar $HNO_3$-solution. The technically attainable degree of precipitation for plutonium is about 95%. Together with the americium, 5% of 240 g, i.e., 12 g plutonium per liter remain in the solution. In this 0.05-molar Pu-solution, almost all of the fluoride ions are complex bound. After filtration of the solid Pu-oxalate, the filtrate is reduced by evaporation to 3.5 l and can be returned again as the dissolving acid to the dissolving vessel for a new dissolution cycle. The complex-bound fluorides employed in the first cycle are therefore not lost but pass through all further dissolving cycles, bound to the fluoride carrier, plutonium. The americium concentration is increased with every cycle and thereby also the radiation exposure of the circuit. To observe maximum values of the radiation exposure within the installation it is desirable to transport, after a certain number of cycles which depends on the americium content, the filtrate of the Pu-oxalate precipitation to a final treatment as liquid radioactive waste, which has only a small volume. If, however, the remaining plutonium is to be separated from this solution first, it is advisable to displace plutonium from the fluoride complex by adding very strong sequestering agents such as zirconium (the stability constant of the $ZrF^{3+}$-complex is $6.3 \times 10^9$) and to convert it into a $Pu(NO_3)_2^-$-ion. By using an anion exchanger, these ions can be removed from the solution, while the cationic zirconium-fluoride complexes remain in solution associated with americium and are fed into the waste. However, it would also be possible to obtain therefrom the americium, if required, and to use it for other purposes.

EXAMPLE 2

The insoluble fuel residue which accumulates in the processing of spent nuclear fuel in the nitric-acid dissolver, which contains $PuO_2$, is to be put in solution. In order to protect the dissolving vessel consisting of stainless steel from corrosion effects, the procedure, as in Example 1, is used. The undissolved nuclear fuels, which also contain zirconium as fission products, are placed in a solution consisting of 0.05 molar $Pu(NO_3)_4$, 0.05 molar HF and 14.5 molar $HNO_3$ and are dissolved while boiling. In this solution, fluoride is bound, according to the stability constant of the zirconium- and plutonium-fluoride complex, mainly in the more stable zirconium complex. As a result thereof, the catalytically effective fluoride ions are depleted in the solution, so that HF solution has to be added to obtain a satisfactory dissolution rate.

In this fission material solution so produced, Pu-fluoride complexes are present which can interfere with the later extraction process for separating the fission products, for instance, in the well-known Purex process. For converting the plutonium from the complex into a $Pu^{4+}$-ion, further quantities of zirconium salt equivalent to the added amount of HF are added in addition to the original zirconium, in order to relocate the fluoride of the PuF complex into a ZrF complex. The fluoride thereby remains at the zirconium during the extraction and thus has lost its corrosive property. The entire amount of the plutonium is available for further processing. The fluoride, on the other hand, is ultimately taken to the highly active waste, together with the zirconium.

This sequestering of the fission product zirconium with fluoride ions has the further advantage that the formation of undesired separation layer precipitates, polymerisates of zirconium ions and radiation-damaged tributyl phosphate (also called "crud") does not take place during the extraction.

These examples show that an extremely small fluoride concentration, namely less than 100 ppm, is sufficient to obtain satisfactory dissolution rates for $PuO_2$. Since fluoride ions are not used up in the process, one can speak of a catalytic action thereof.

It should be pointed out that according to the principle of sequesterization described here and the low concentration of free fluoride ions caused thereby, other hard-to-dissolve nuclear fuel oxides such as thorium dioxide, can also be dissolved and processed further.

We claim:

1. Method for dissolving hard-to-dissolve nuclear fuels selected from the group consisting of $ThO_2$ and $PuO_2$ in a nitric acid fission material solution containing fluoride ions, which comprises adding hard-to-dissolve nuclear fuel to a nitric acid fission material solution to dissolve the nuclear fuel in which said solution contains nitric acid and a fluoride complex selected from the group consisting of a U-fluoride complex and a Pu-fluoride complex to provide free fluoride ions in a small catalytically active amount due to small dissociation of fluoride ions from said fluoride complex.

2. Method according to claim 1, wherein said nuclear fuel is dissolved at the boiling temperature of the solution.

3. Method according to claim 1, wherein after dissolving said nuclear fuels in said solution a sequestering agent is added to said fluoride complex in solution to form a more stable complex and to displace and liberate the metal selected from the group consisting of Pu and U in the complex in the form of ions and separating the ions from the more stable fluoride complex in the solution by passing it in contact with an ion exchanger.

4. Method according to claim 3, wherein said sequestering agent is a zirconium salt.

5. Method according to claim 1, wherein after dissolving said hard-to-dissolve nuclear fuels said solution containing said fluoride complex is subjected to selective precipitation and separation of dissolved nuclear fuels leaving a remaining solution containing small dissolved amounts of metal selected from the group consisting of Pu and U with complex-bound fluoride ions, and wherein said remaining solution is returned for use as a solvent for dissolving further amounts of hard-to-dissolve nuclear fuel.

* * * * *